(12) United States Patent
Bonnin et al.

(10) Patent No.: US 7,456,556 B2
(45) Date of Patent: Nov. 25, 2008

(54) LAMP FOR HEATING HAVING A REFLECTIVE FILM FOR TRANSMITTING DIFFERENT RADIATION PORTIONS

(75) Inventors: Michelle Bonnin, Vandieres (FR); Sylvain Chehu, Champigneulles (FR); Jean-Jacques Frey, Maidieres (FR); Jerôme Martinache, Pont-A-Mousson (FR); Philippe Lucien Poirson, Villers les Nancy (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 175 days.

(21) Appl. No.: 10/553,557

(22) PCT Filed: Apr. 15, 2004

(86) PCT No.: PCT/IB2004/001203

§ 371 (c)(1), (2), (4) Date: Oct. 19, 2005

(87) PCT Pub. No.: WO2004/095504

PCT Pub. Date: Nov. 4, 2004

(65) Prior Publication Data

US 2006/0192470 A1    Aug. 31, 2006

(30) Foreign Application Priority Data

Apr. 23, 2003 (EP) .................................. 03290991

(51) Int. Cl.
*H01L 33/00* (2006.01)
*H01J 1/62* (2006.01)
*C09K 11/06* (2006.01)

(52) U.S. Cl. ..................... 313/25; 313/570; 313/113; 313/110

(58) Field of Classification Search .................. None
See application file for complete search history.

(56) References Cited

U.S. PATENT DOCUMENTS

| 4,588,923 | A | | 5/1986 | Hoegler et al. |
| 5,045,748 | A | * | 9/1991 | Ahlgren et al. ............. 313/113 |
| 5,105,119 | A | * | 4/1992 | Dayton ................. 313/318.01 |
| 6,462,465 | B1 | * | 10/2002 | Israel et al. .................... 313/25 |
| 2003/0007363 | A1 | | 1/2003 | Yagi |
| 2004/0056576 | A1 | * | 3/2004 | Marsh .......................... 313/17 |

FOREIGN PATENT DOCUMENTS

| EP | 0345890 A1 | 12/1989 |
| EP | 0345890 B1 | 12/1989 |
| EP | 0702396 A2 | 3/1996 |
| FR | 1605130 A | 3/1973 |
| GB | 2176587 A | 12/1986 |

* cited by examiner

Primary Examiner—Joseph L Williams

(57) ABSTRACT

A lamp includes a lamp vessel, an incandescent body arranged in the lamp vessel, and current supply conductors connected to the incandescent body. The incandescent body is configured to emit a radiation spectrum including a visible portion and an infrared portion. An outer envelope around the lamp vessel has a reflective film adapted to transmit a first part of the visible portion and a second part of the infrared portion, the second part being greater than the first part.

11 Claims, 4 Drawing Sheets

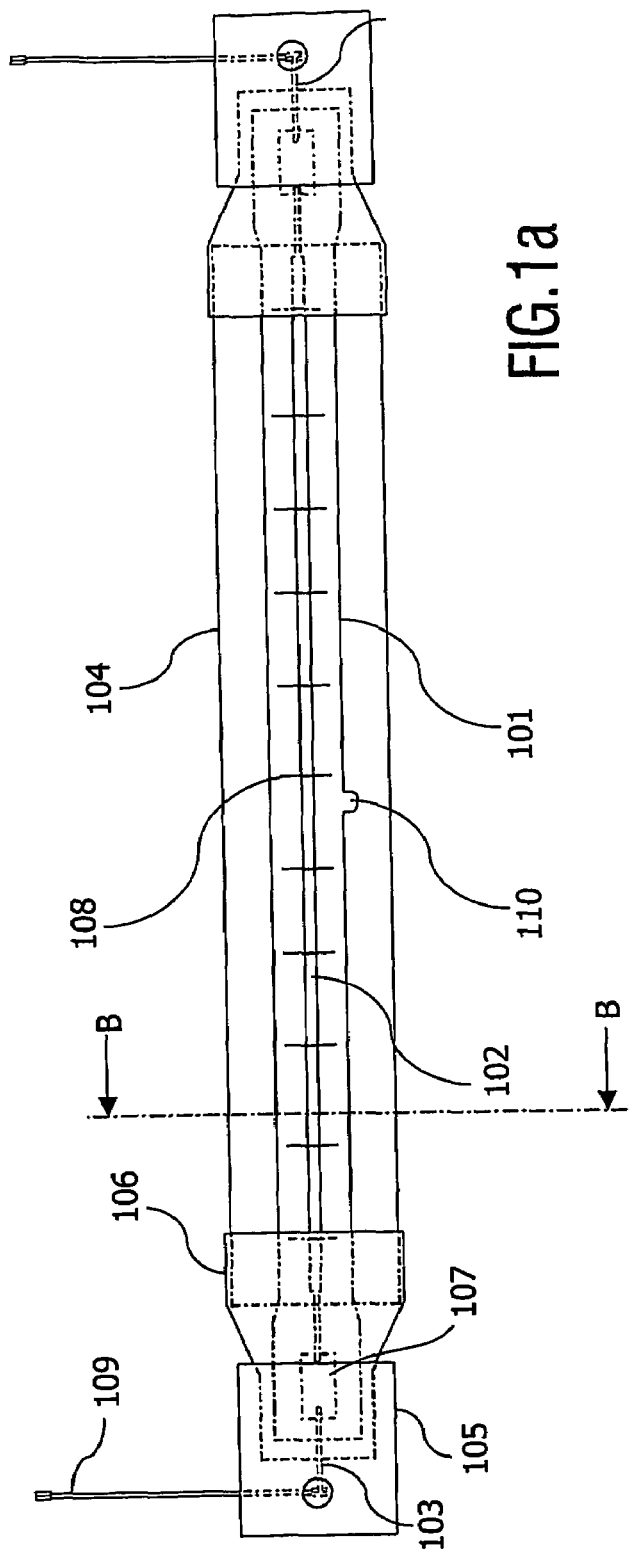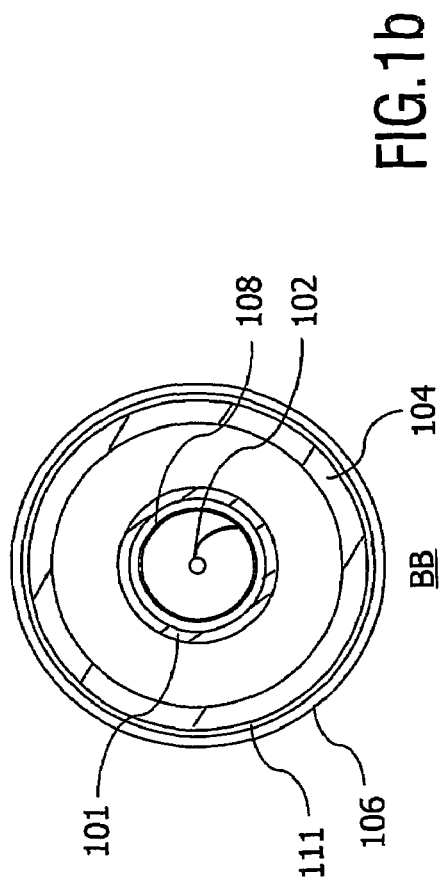

LAMP FOR HEATING HAVING A REFLECTIVE FILM FOR TRANSMITTING DIFFERENT RADIATION PORTIONS

FIELD OF THE INVENTION

The present invention relates to a lamp for heating.

The present invention is particularly relevant for a lamp adapted to person heating.

BACKGROUND OF THE INVENTION

Patent U.S. Pat. No. 4,588,923 describes a lamp adapted to various needs, such as person heating. A lamp adapted to radiant heating emits substantially only infrared radiation. When infrared radiation impinges onto the skin of a person, the radiation interacts with the nerve ends and creates a sensation of warmth for the person. The lamp described in this patent comprises a radiant source, such as a tungsten filament, which is housed in a lamp vessel comprising a gas such as argon, with a small quantity of a halide substance. The radiant source emits radiations both in the visible and infrared parts of the radiation spectrum. In order to transmit a large part of the infrared radiation and stop a large part of the visible radiation, the lamp vessel comprises a reflective film on its outer surface, which reflective film is adapted to transmit substantially only infrared radiation.

In such a lamp, the lamp vessel reaches a relatively high temperature, which depends on the linear power density of the lamp. The larger the linear power density, the larger the temperature of the lamp vessel. However, when the lamp vessel reaches a relatively high temperature, the reflective film, deposited on the lamp vessel, may be degraded, especially when the lamp has been used for a relatively long time. As a consequence, the linear power density of such a lamp is limited.

SUMMARY OF THE INVENTION

It is an object of the invention to provide a lamp for heating, which can have higher linear power densities.

To this end, the invention proposes a lamp comprising a lamp vessel, an incandescent body arranged in the lamp vessel and current supply conductors connected to the incandescent body, said incandescent body being intended to emit a radiation spectrum comprising a visible portion and an infrared portion, the lamp comprising an outer envelope around said lamp vessel, said outer envelope comprising a reflective film adapted to transmit a first part of the visible portion and a second part of the infrared portion, said second part being greater than said first part.

According to the invention, the lamp comprises an outer envelope around the lamp vessel, said outer envelope comprising the reflective film adapted to transmit substantially only the infrared radiation. As a consequence, the reflective film is not deposited on the lamp vessel, and is thus submitted to lower temperatures than in the lamp of the prior art, for a same linear power density. Hence, higher linear power densities can be used in the lamp in accordance with the invention, without degrading the reflective film.

In an advantageous embodiment of the invention, the lamp vessel comprises a reflective layer deposited on a part of said vessel. This embodiment is particularly advantageous, because such a lamp does not require any external reflector. Actually, in order to direct and focus the radiation, an external reflector is usually used in combination with a lamp emitting substantially in the infrared range of the radiation spectrum. With the lamp according to the advantageous embodiment of the invention, the reflector is embedded in the lamp, by means of a reflective layer deposited on the part of the lamp vessel, which leads to a more compact lamp system. The reflective layer is, for example, a gold or a ceramic layer.

In a preferred embodiment of the invention, the lamp is a double-ended lamp, which comprises a cap at each end of the lamp vessel, the outer envelope being supported coaxially to the lamp vessel by means of two shells, each shell having a part extending inside a cap and a part designed for supporting an end of the outer envelope.

Such a double-ended lamp is particularly easy to manufacture. Actually, the outer envelope can be obtained from a tube on which the reflective film is deposited, which tube is then cut in order to obtain a plurality of outer envelopes. Relatively long tubes can easily be manufactured, on which the reflective film is deposited before cutting. Then, the outer envelope can easily be placed around a conventional lamp vessel, by means of the shells.

In another preferred embodiment of the invention the lamp is a double-ended lamp, which comprises a cap at each end of the lamp vessel, said cap comprising a first section for receiving an end of the lamp vessel and a second section for supporting the outer envelope. Compared to the preferred embodiment, wherein the lamp comprises caps and shells, a cap is used at each end of the lamp, which plays the role of the cap and the shell. This simplifies the manufacturing process of the lamp.

These and other aspects of the invention will be apparent from and will be elucidated with reference to the embodiments described hereinafter.

BRIEF DESCRIPTION OF THE DRAWINGS

The invention will now be described in more detail, by way of example, with reference to the accompanying drawings, in which:

FIGS. 1a and 1b show a double-ended lamp in accordance with the invention;

DETAILED DESCRIPTION OF THE INVENTION

Figure 2:
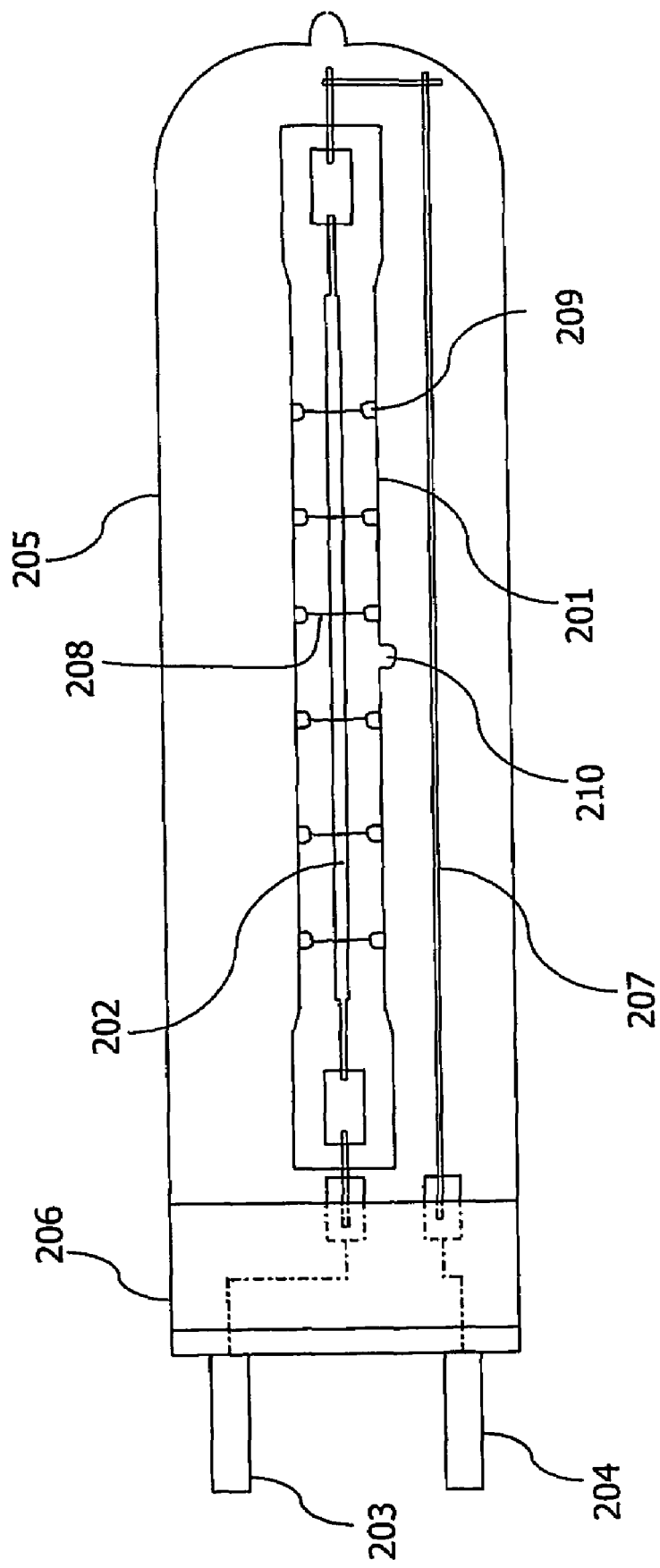
FIG. 2 shows a single-ended lamp in accordance with the invention.

A double-ended lamp in accordance with the invention is depicted in FIGS. 1a and 1b. FIG. 1b is an enlarged cross-section in the plane BB of FIG. 1a. This lamp comprises a lamp vessel 101, an incandescent body 102, current supply conductors 103 and an outer envelope 104. The lamp further comprises caps 105, shells 106, foils 107, supports 108, current wires 109 and an exhausting pipe 110. A reflective film 111 is deposited on the outer envelope 104.

The incandescent body 102, which is for example a tungsten wire, has its extremities connected to the foils 107, which are for example pieces of molybdenum to which the extremities of the incandescent body 102 are welded. Current supply conductors 103 are also welded to the foils 107. The current supply conductors are connected to the current wires 109. This can be done by welding a current supply conductor 103 to a current wire 109, through a hole of a cap 105. Such a cap 105 is described in patent EP 0345890. Alternatively, the extremity of the incandescent body 102 serves as current supply conductor and is directly connected to the current wire 109. The incandescent body 102 is maintained in position inside the lamp vessel 101, by means of the supports 108, which permit a right positioning of the incandescent body 102 in the lamp vessel 101.

The lamp vessel 101 is filled with a high-pressure discharge gas, such as argon, and comprises a small quantity of a halide substance in order to prevent darkening of the lamp vessel 101, due to deposition of gaseous tungsten. The diameter of the lamp vessel 101 should be kept as small as possible. Actually, for a given linear power density of the incandescent body 102, a too large diameter of the lamp vessel 101 perturbs the halogen cycle inside the lamp vessel, which can lead to darkening of the lamp vessel 101.

The incandescent body 102 inside the lamp vessel 101 emits a radiation spectrum, which comprises a visible portion and an infrared portion. As this lamp is used for heating, it is desired that a large part of the infrared radiation is transmitted outside the lamp, whereas a large part of the visible radiation is not transmitted. Actually, especially in applications such as person heating, the visible radiation is undesired, because it causes glare and disturbs the persons. Hence, a reflective film 111 is used in the lamp, which is adapted to transmit a first part of the visible portion and a second part of the infrared portion, the second part being greater than the first part. In other words, the reflective film 111 is adapted to transmit a large part of the infrared radiation emitted by the incandescent body 102, and a low part of the visible radiation emitted by the incandescent body 102. Such a reflective film 111 is known from those skilled in the art. For example, patent U.S. Pat. No. 4,588,923 describes such a reflective film. The described reflective film comprises tantalum pentoxide $Ta_2O_5$ and silicon dioxide $SiO_2$ arranged into a multi-layer film. Another example of such a reflective film 111 is a film used in a lamp sold by the applicant under reference 15009Z. This film comprises alternating layers of high and low refractive indices, the low refractive layers comprising $SiO_2$ and the high refractive layers comprising $Fe_2O_3$.

As the lamp of FIGS. 1a and 1b is used for heating, it utilizes a relatively high wattage, which is typically more than 1000 watts, so that some parts of the lamp such as the lamp vessel 101 are submitted to relatively high temperature, typically around 1000° C. If the reflective film is deposited on the lamp vessel 101, the reflective film rapidly becomes fragile and is rapidly degraded, so that the lamp lifetime is reduced. This is especially the case with reflective films in accordance with the invention, which are fragile, due to the fact that their manufacturing process utilizes a sol-gel technology. Moreover, the smaller the diameter of the lamp vessel 101, the higher its temperature and the more rapid the degradation of the reflective film. Hence, as a small diameter of the lamp vessel 101 is required, a reflective film deposited on the lamp vessel 101 is not compatible with such a lamp vessel.

As a consequence, the reflective film 111 in the lamp in accordance with the invention is deposited on the outer envelope 104. This outer envelope 104, which is farther from the incandescent body 102 than the lamp vessel 101, reaches lower temperatures, so that the reflective film 111 is not degraded. The diameter of the lamp vessel 101 can thus be kept as small as desired, as the degradation of the reflective film does not depend on said diameter. The wattage of the lamp can also be increased, without risks of degradation of the reflective film 111. Such a lamp can thus have increased linear power densities, without decreasing its lifetime.

It should be noted that the reflective film 111 can be deposited on an external face of the outer envelope 104, or on an inner face of the outer envelope 104, or can be a combination of a reflective film deposited on the external face of the outer envelope 104 and a reflective film deposited on the inner face of the outer envelope 104.

Moreover, the outer envelope 104 is particularly advantageous. In case of lamp failure or even explosion of the lamp vessel, thanks to the outer envelope 104, any glass pieces that may fall off safely remain inside the outer envelope 104, so that the persons using such a lamp cannot be injured.

Such a lamp is particularly easy to manufacture. Actually, manufacturing a lamp of the prior art requires depositing the reflective film on a conventional lamp comprising an incandescent body, current supply conductors, a lamp vessel and caps. The manufacturing process thus requires, for each lamp, a step of deposition of the reflective film, which is a long and delicate step. In the lamp of FIGS. 1a and 1b, the outer envelope 104 is a tube, for example of quartz or glass, on which the reflective film is deposited. The outer envelope 104 can thus be obtained from a long tube having a length of, for example, ten outer envelopes 104, on which the reflective film is deposited. This long tube is then cut in order to obtain the outer envelope 104. In this case, only one deposition step is required in order to manufacture ten lamps in accordance with the invention.

The lamp of FIGS. 1a and 1b is then manufactured as described hereinafter. A part of a first shell 106 is inserted inside a first cap 105. A first extremity of a conventional lamp comprising the incandescent body 102, the supports 108, the lamp vessel 101, the foils 107 and the current supply conductors 103 is then inserted into the first shell 106. A first current supply conductor 103 is welded to a first current wire 109, through a hole of the first cap 105. Then, a first extremity of the outer envelope 104 is inserted into the first shell 106. Then, a second extremity of the outer envelope 104 is inserted into a second shell 106, as well as a second extremity of the conventional lamp. A part of this second shell 106 is then inserted into a second cap 105. A second current supply conductor 103 is then welded to a second current wire 109, through a hole of the first cap 105.

A cap 105 and a shell 106 of FIG. 1a can be replaced by a unique cap, which shape is a combination of the shapes of the cap 105 and shell 106. This unique cap, at each end of the lamp, thus comprises a first section for receiving an end of the lamp vessel and a second section for supporting the outer envelope.

The lamp of FIG. 1a comprises an exhausting pipe 110. The exhausting pipe 110 is due to the manufacturing process of the lamp vessel 101. Actually, during the manufacturing process, it is usual to make a hole in the lamp vessel 101, in order to fill the lamp vessel with gas. The presence of the exhausting pipe 110 is due to the hole made during the manufacturing process. In a lamp of the prior art, with the reflective film deposited on the lamp vessel, the presence of the exhausting pipe is a drawback. Actually, the efficacy of the reflective film deposited on the exhausting pipe is reduced, and the visible light emitted by the lamp is not uniformly emitted, because the exhausting pipe causes refraction of the radiation beams transmitted through the reflective film. This often causes glare, which is a drawback for the persons using such a lamp. In the lamp in accordance with the invention, these problems are solved, because the reflective film 111 is deposited on the outer envelope 104, which does not comprise any exhausting pipe. This improves the efficacy of the reflective film, as well as the emission of the visible light.

A similar problem may occur if the lamp vessel 101 comprises indents. This is explained in more details in FIG. 2.

It should be noticed that the lamp of FIGS. 1a and 1b can comprise an additional film, which is deposited on the inner or the outer face of the lamp vessel 101. This additional film should resist at higher temperatures than the reflective film 111, in order not to be degraded. This allows using different filterings in a same lamp.

A single-ended lamp in accordance with the invention is depicted in FIG. 2. This lamp comprises a lamp vessel 201, an incandescent body 202, a first and a second current supply conductor 203 and 204, an outer envelope 205, a cap 206, a conductive rod 207, supports 208, indents 209 and an exhausting pipe 210. A first extremity of the incandescent body 202 is connected to the first current supply conductor 203, a second extremity of the incandescent body 202 is connected to the second current supply conductor 204, via the conductive rod 207.

The space between the outer envelope 205 and the lamp vessel 201 might be filled with a gas under pressure, or might comprise air. Such a lamp is manufactured as conventional single-ended lamps, except that the wire of a conventional single-ended lamp is replaced by a double-ended lamp comprising the incandescent body 202, the supports 208 and the lamp vessel 201 filled with an inert gas under pressure. A reflective film is deposited on the outer envelope 205, as described in FIGS. 1a and 1b.

The lamp of FIG. 2 comprises indents 209, which are formed in the lamp vessel 201. Indents 209, which are made on the lamp vessel 201, at the location of each support 208, are necessary when the lamp is used vertically in order to maintain the incandescent body 202 in its position, preventing the filament collapse due to gravity. In a lamp of the prior art, comprising such indents and a reflective film, the presence of such indents is a drawback, since they create shortcomings in the reflecting film deposition, altering the efficacy of the reflective film in the indents areas, which can become sources of glare. In the lamp in accordance with the invention, these problems are solved, because the reflective film is deposited on the outer envelope 205, which does not comprise any indents.

Figure 3A:
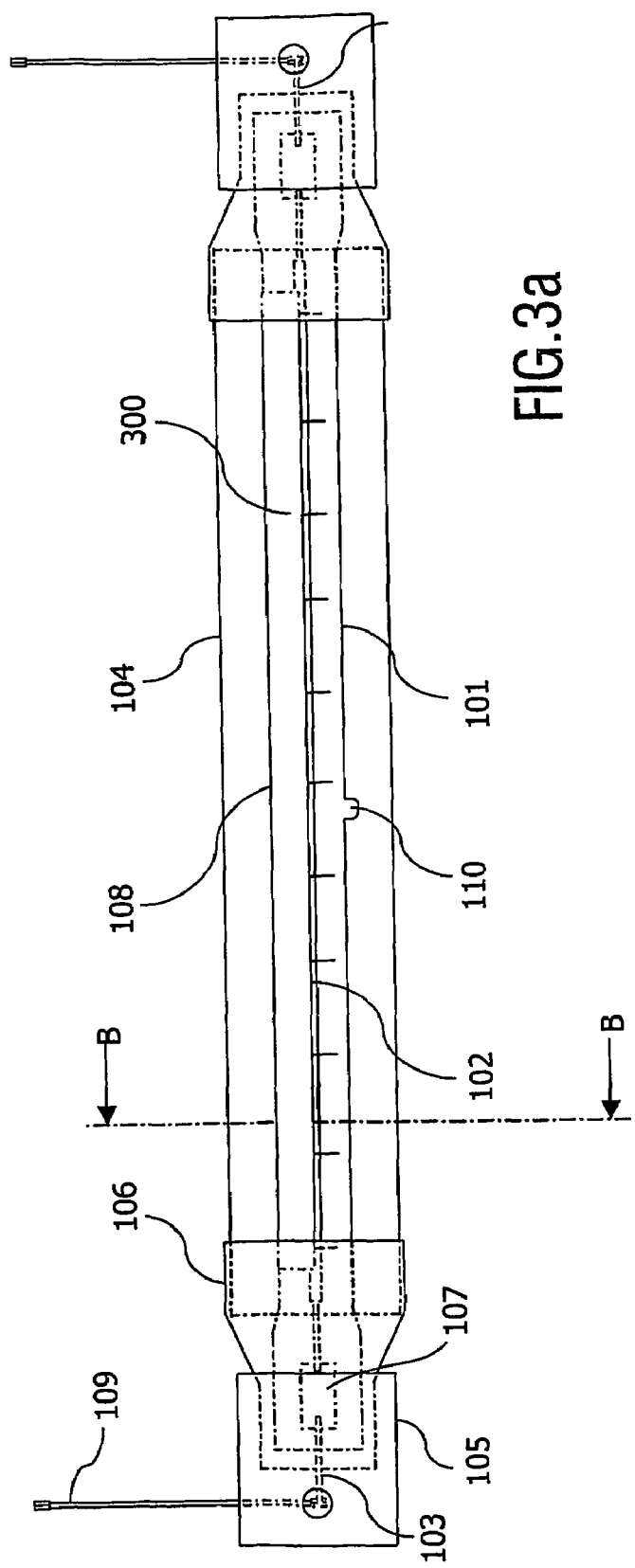
FIGS. 3a and 3b show a double-ended lamp in accordance with an advantageous embodiment of the invention.
Figure 3B:
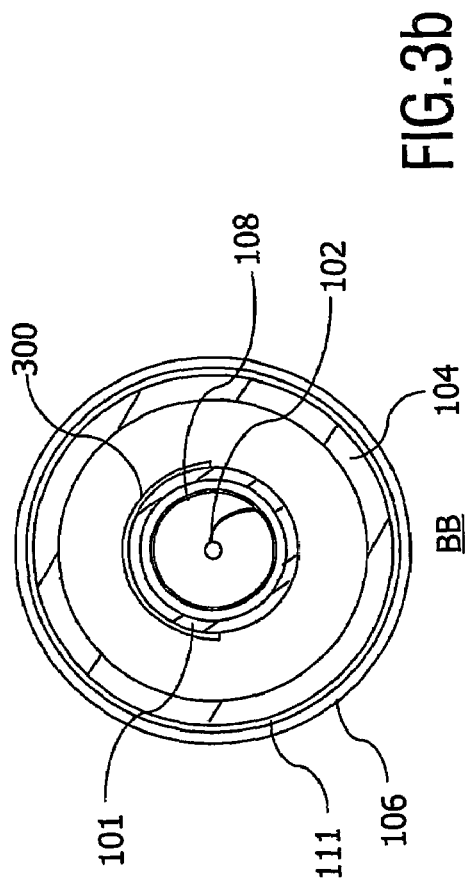

A double-ended lamp in accordance with an advantageous embodiment of the invention is depicted in FIGS. 3a and 3b. FIG. 3b is an enlarged cross-section in the plane BB of FIG. 3a. The lamp depicted in FIGS. 3a and 3b comprises the same elements as the lamp of FIGS. 1a and 1b. The lamp of FIGS. 3a and 3b further comprises a reflective layer 300 deposited on a part of the lamp vessel 101. Such a reflective layer 300 is known from those skilled in the art. For example, a gold reflective layer can be deposited on the lamp vessel 101, by means of conventional techniques, such as vapor deposition. Preferably, the reflective layer 300 is a ceramic reflective layer. Such a ceramic reflective layer is used, for example, in a halogen lamp sold by the applicant under reference 13195Z/98.

Such a ceramic reflective layer 300 has the advantage that it resists at relatively high temperatures, such as 2000° C. This is particularly advantageous in the lamps in accordance with the invention, which operating temperatures can be above 1000° C., depending on the linear power density. Actually, lamps comprising a reflective film adapted to transmit a large part of the infrared radiation and a low part of the visible radiation are used for heating, which implies that their operating temperatures are relatively high.

Such a reflective layer 300 provides focalization of the radiation beams emitted by the incandescent body 102, which is necessary in order to direct the radiation beam to a person or an object to heat. As a consequence, no external reflector is required, which is an advantage, because such an external reflector is bulky and limits the compactness of the lamp system.

In the lamp of the prior art, it is not possible to use such a reflective layer on the lamp vessel, because the lamp vessel already comprises the reflective film. As a consequence, in order to focus the heat, the lamp of the prior art has to be used in combination with an external reflector, which is a drawback in terms of compactness of the overall heating system.

It should be noted that the reflective layer 300 can be deposited on an internal face of the lamp vessel 101, instead of being deposited on an external face, as depicted on FIGS. 3a and 3b.

Figure 4:
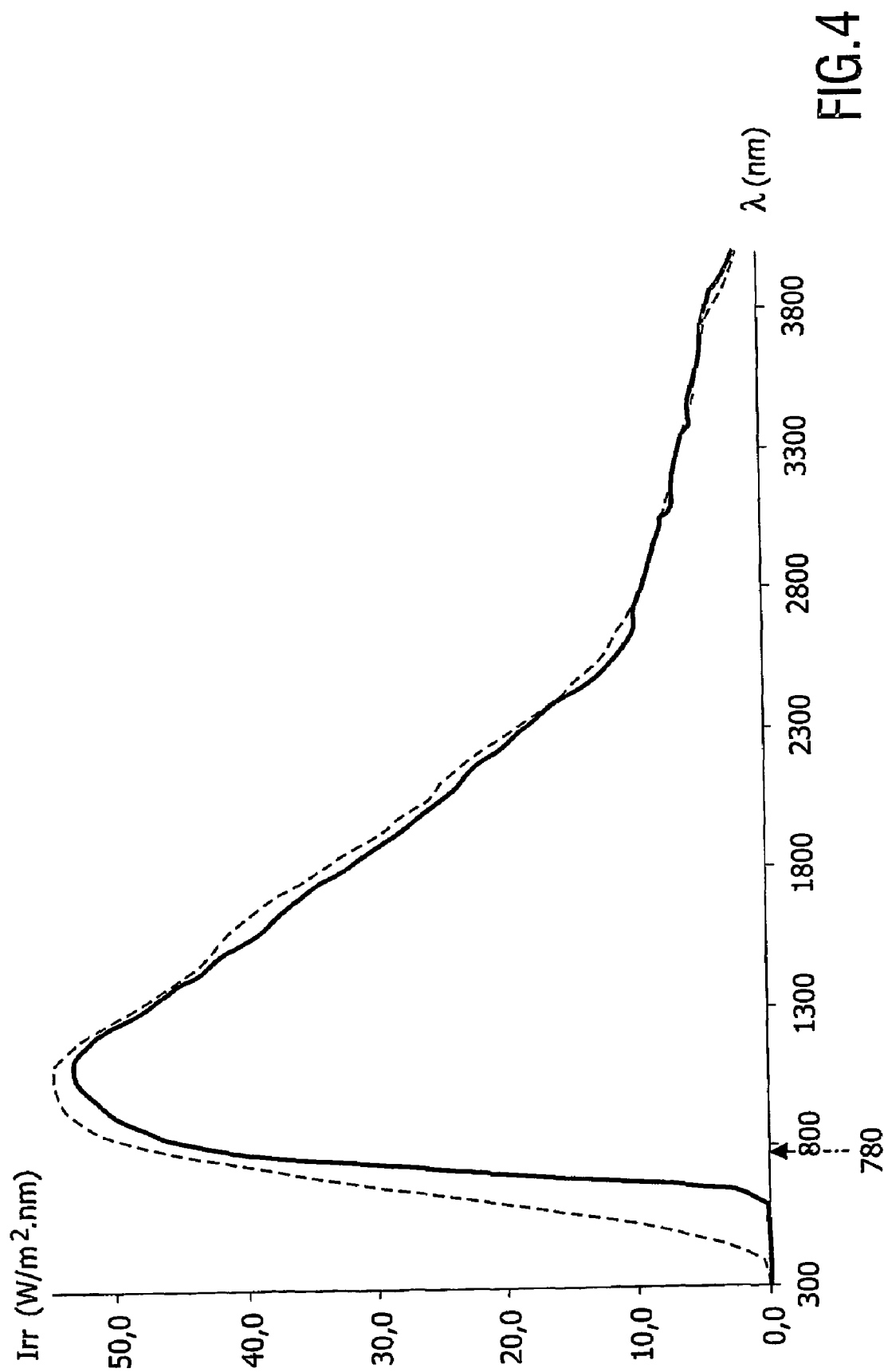
FIG. 4 shows a spectrum representing the irradiance of a lamp in accordance with the invention, as a function of the wavelength, with and without reflective film.

FIG. 4 shows a spectrum of a lamp in accordance with the invention. The curves represent the irradiance of a lamp measured, corrected at a distance of 1 meter from the lamp. The irradiance can be measured by conventional means, such as radiometry or spectrophotometry. The curve in dotted line corresponds to a lamp without reflective film on the outer envelope, whereas the curve in continuous line corresponds to a lamp with a reflective film on the outer envelope. The reflective film in this example is the film used in the lamp sold by the applicant under reference 15009Z.

The visible radiation is usually defined between 380 and 780 nanometers. The infrared radiation is defined above 780 nanometers (definitions from the International Electrotechnical Commission (IEC)—Section 845-01 "Radiation, Quantities and Units" (1987)). As can be seen from the curve in dotted line, the incandescent body emits a radiation spectrum comprising a visible portion and an infrared portion. By means of the reflective film on the outer envelope, only a small part of the visible portion is transmitted. This part depends on the nature of the reflective film. In this example, the part of the visible light transmitted by the reflective film is about 25 percent. It is desired that this part is as low as possible, in order not to cause glare. In practice, it is preferable that the part of the visible light transmitted by the reflective film is lower than 30 percent.

The part of the infrared portion transmitted through the reflective film is much higher, as can be deducted from the two curves. Actually, the reflective film transmits almost all the wavelengths above 780 nanometers. In this example, the part of the transmitted infrared portion is about 95 percent. This part should be as high as possible, in order to improve the heating efficacy of the lamp. It is thus preferable that this part is larger than 80 percent.

Of course, as soon as the part of transmitted infrared portion is larger that the part of transmitted visible portion, the lamp plays its role of heating lamp, and does not cause too much glare. Nevertheless, it is preferable that the part of transmitted infrared portion is as large as possible and the part of transmitted visible portion is as low as possible.

Any reference sign in the following claims should not be construed as limiting the claim. It will be obvious that the use of the verb "to comprise" and its conjugations does not exclude the presence of any other elements besides those defined in any claim. The word "a" or "an" preceding an element does not exclude the presence of a plurality of such elements.

the invention claimed is:

1. A lamp comprising:
a lamp vessel,
an incandescent body arranged in the lamp vessel,
current supply conductors connected to the incandescent body, said incandescent body being configured to emit a radiation spectrum comprising a visible portion and an infrared portion,
an outer envelope around said lamp vessel, said outer envelope comprising a reflective film fully coating said outer envelope, said reflective film being adapted to transmit a first part of the visible portion and a second part of the infrared portion, said second part being greater than said first part, and a cap having one section for supporting the outer envelope.

2. The lamp as claimed in claim 1, wherein the first part is inferior to 30 percent and the second part is superior to 80 percent.

3. The lamp as claimed in claim 1, wherein the lamp vessel comprises a reflective layer deposited on a first part of said vessel and not deposited on a second part of said vessel.

4. The double-ended lamp as claimed in claim 1, said lamp comprising a cap at each end of the lamp vessel, the outer envelope being supported coaxially to the lamp vessel by means of two shells each shell having a part extending inside a cap and a part designed for supporting an end of the outer envelope.

5. The double-ended lamp as claimed in claim 1, said lamp comprising a cap at each end of the lamp vessel, said cap comprising a first section for receiving an end of the lamp vessel and a second section for supporting the outer envelope.

6. The lamp of claim 1, wherein the outer envelope and the cap fully encapsulate the lamp vessel.

7. A lamp comprising:
a lamp vessel;
an incandescent body arranged in the lamp vessel and configured to emit a radiation spectrum comprising a visible portion and an infrared portion;
an outer envelope located around said lamp vessel; and
a cap having one section for supporting the outer envelope;
wherein said outer envelope comprises a reflective film fully coating said outer envelope, said reflective film being adapted to transmit a first part of the visible portion and a second part of the infrared portion, said second part being greater than said first part.

8. The lamp of claim 7, wherein the outer envelope and the cap fully encapsulate the lamp vessel.

9. The lamp of claim 7, wherein the cap has another section for receiving an end of the lamp vessel.

10. The lamp of claim 7, wherein a first part of said vessel is coated with a reflective layer and a second part of said vessel is not coated with the further reflective layer.

11. The lamp of claim 7, further comprising a reflective layer that partially covers said vessel to form a focusing reflector configured to direct light from the lamp.

* * * * *